(12) United States Patent
Tanaka et al.

(10) Patent No.: US 11,885,521 B2
(45) Date of Patent: Jan. 30, 2024

(54) AIR CONDITIONING SYSTEM

(71) Applicant: DAIKIN INDUSTRIES, LTD., Osaka (JP)

(72) Inventors: Shuuichi Tanaka, Osaka (JP); Yoshiteru Nouchi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 90 days.

(21) Appl. No.: 17/603,758

(22) PCT Filed: Apr. 15, 2020

(86) PCT No.: PCT/JP2020/016619
§ 371 (c)(1),
(2) Date: Oct. 14, 2021

(87) PCT Pub. No.: WO2020/213656
PCT Pub. Date: Oct. 22, 2020

(65) Prior Publication Data
US 2022/0178576 A1 Jun. 9, 2022

(30) Foreign Application Priority Data
Apr. 15, 2019 (JP) .................................. 2019-077307

(51) Int. Cl.
*F24F 11/74* (2018.01)
(52) U.S. Cl.
CPC .................................. *F24F 11/74* (2018.01)
(58) Field of Classification Search
CPC .. F24F 11/74; F24F 11/77; F24F 11/79; F24F 11/89; F24F 11/84
See application file for complete search history.

(56) References Cited

U.S. PATENT DOCUMENTS 4,513,574 A * 4/1985 Humphreys ............ F25D 16/00
454/236
4,635,445 A * 1/1987 Otsuka ..................... F24F 11/77
62/158

(Continued)

FOREIGN PATENT DOCUMENTS

CN 101769574 A 7/2010
CN 109163386 A 1/2019

(Continued)

OTHER PUBLICATIONS

Extended European Search Report for European Application No. 19925110.9, dated May 9, 2022.

(Continued)

*Primary Examiner* — Nelson J Nieves
(74) *Attorney, Agent, or Firm* — BIRCH, STEWART, KOLASCH & BIRCH, LLP

(57) ABSTRACT

An air conditioning system configured to supply a plurality of places in a building with conditioned air with use of ducts inhibits malfunction of the air conditioning system due to airflow volume through a utilization heat exchanger. A heat exchanger unit includes a utilization heat exchanger. The heat exchanger unit is connected with a plurality of ducts. A plurality of fan units sucks conditioned air from the heat exchanger unit through the plurality of ducts and supplies a plurality of blow-out ports with the conditioned air. The fan units include fan motors as a plurality of actuators configured to individually change supply air volume of the conditioned air. A main controller controls the plurality of fan motors such that airflow volume through the utilization heat exchanger satisfies a predetermined condition.

16 Claims, 5 Drawing Sheets

(56) References Cited

U.S. PATENT DOCUMENTS

| | | | | |
|---|---|---|---|---|
| 4,921,164 | A | * | 5/1990 | Gotou .................... F24F 11/72 236/49.3 |
| 4,997,030 | A | * | 3/1991 | Goto ...................... F24F 11/76 236/51 |
| 5,004,149 | A | * | 4/1991 | Narikiyo ................ F24F 11/76 236/49.3 |
| 5,076,346 | A | * | 12/1991 | Otsuka .................... F24F 3/044 165/246 |
| 5,179,524 | A | * | 1/1993 | Parker .................... F24F 11/77 165/238 |
| 5,230,719 | A | | 7/1993 | Berner et al. |
| 5,305,953 | A | * | 4/1994 | Rayburn ................ F24F 11/76 236/49.3 |
| 5,344,069 | A | * | 9/1994 | Narikiyo ................ F24F 11/75 165/215 |
| 5,417,077 | A | * | 5/1995 | Jeffery .................... F24F 11/63 236/49.3 |
| 5,417,368 | A | * | 5/1995 | Jeffery ............... G05D 23/1934 236/49.3 |
| 5,701,750 | A | | 12/1997 | Ray |
| 5,772,501 | A | * | 6/1998 | Merry .................... F24F 3/044 454/229 |
| 5,863,246 | A | * | 1/1999 | Bujak, Jr. ................ F24F 11/70 454/238 |
| 5,979,167 | A | * | 11/1999 | Kochavi ................ F24F 11/84 62/203 |
| 6,601,168 | B1 | | 7/2003 | Stancil et al. |
| 8,814,639 | B1 | | 8/2014 | Mecozzi |
| 9,188,355 | B1 | | 11/2015 | Allen et al. |
| 9,534,797 | B2 | * | 1/2017 | Tsutsumi ................ F24F 11/77 |
| 11,614,244 | B2 | * | 3/2023 | Tanaka .................... F24F 11/89 62/186 |
| 2006/0116067 | A1 | * | 6/2006 | Federspiel ........... F24F 11/0001 454/256 |
| 2006/0234621 | A1 | | 10/2006 | Desrochers et al. |
| 2008/0242218 | A1 | * | 10/2008 | Asano .................... F24F 1/0007 454/338 |
| 2010/0174414 | A1 | | 7/2010 | Takagi et al. |
| 2010/0323604 | A1 | | 12/2010 | Duffe |
| 2012/0192955 | A1 | * | 8/2012 | Dazai .................... F24F 3/044 236/49.3 |
| 2012/0295530 | A1 | | 11/2012 | Ikeno et al. |
| 2013/0281000 | A1 | | 10/2013 | Newcomer |
| 2014/0273797 | A1 | | 9/2014 | Jensen |
| 2015/0241076 | A1 | | 8/2015 | Eguchi et al. |
| 2017/0299211 | A1 | * | 10/2017 | Kobayashi ............. F24F 3/044 |
| 2017/0341094 | A1 | | 11/2017 | Khalitov et al. |
| 2018/0045424 | A1 | * | 2/2018 | Yajima .................... F24F 7/007 |
| 2018/0100667 | A1 | | 4/2018 | Komae et al. |
| 2018/0363933 | A1 | | 12/2018 | Ross |
| 2019/0024929 | A1 | | 1/2019 | Funada et al. |
| 2019/0331358 | A1 | | 10/2019 | Ritmanich et al. |
| 2020/0340485 | A1 | * | 10/2020 | Fessel .................... F04D 27/004 |
| 2021/0404695 | A1 | * | 12/2021 | Saito ...................... F24F 11/77 |

FOREIGN PATENT DOCUMENTS

| | | |
|---|---|---|
| DE | 202018000922 U1 | 4/2018 |
| EP | 2781846 A1 | 9/2014 |
| JP | 59-184033 U | 12/1984 |
| JP | 60-21653 U | 2/1985 |
| JP | 61-71840 U | 5/1986 |
| JP | 61-71840 U | 5/1986 |
| JP | 1-300135 A | 12/1989 |
| JP | 4-32634 A | 2/1992 |
| JP | 4-116329 A | 4/1992 |
| JP | 5-157278 A | 6/1993 |
| JP | 5-180501 A | 7/1993 |
| JP | 5-223328 A | 8/1993 |
| JP | 6-50597 A | 2/1994 |
| JP | 6-159770 A | 6/1994 |
| JP | 8-42909 A | 2/1996 |
| JP | 8-261545 A | 10/1996 |
| JP | 10-220853 A | 8/1998 |
| JP | 10-253132 A | 9/1998 |
| JP | 11-132489 A | 5/1999 |
| JP | 2001-304614 A | 10/2001 |
| JP | 2002-162067 A | 6/2002 |
| JP | 2002-372277 A | 12/2002 |
| JP | 2005-326106 A | 11/2005 |
| JP | 2008-51466 A | 3/2008 |
| JP | 2010-108359 A | 5/2010 |
| JP | 2010-181046 A | 8/2010 |
| JP | 2010-210216 A | 9/2010 |
| JP | 2011-52905 A | 3/2011 |
| JP | 2012-77968 A | 4/2012 |
| JP | 2012-154596 A | 8/2012 |
| JP | 2012-225640 A | 11/2012 |
| JP | 5426322 B2 | 2/2014 |
| JP | 2014 95541 A | 5/2014 |
| JP | 2015-206519 A | 11/2015 |
| JP | 2018-100791 A | 6/2018 |
| JP | 2018-155444 A | 10/2018 |
| JP | 2019-11884 A | 1/2019 |
| JP | 2019-49387 A | 3/2019 |
| KR | 10-1128574 B1 | 3/2012 |
| KY | 2012-141088 A | 7/2012 |
| TW | M566801 U | 9/2018 |
| TW | I651493 B | 2/2019 |
| WO | WO 2017/159208 A1 | 9/2017 |
| WO | WO 2018/100657 A1 | 6/2018 |

OTHER PUBLICATIONS

Extended European Search Report for European Application No. 20790587.8, dated Apr. 25, 2022.
Extended European Search Report for European Application No. 20790812.0, dated May 9, 2022.
Extended European Search Report for European Application No. 20791231.2, dated May 13, 2022.
Extended European Search Report for European Application No. 20791360.9, dated May 9, 2022.
Extended European Search Report for European Application No. 20794326.7, dated May 19, 2022.
International Search Report for PCT/JP2020/016619 dated Jul. 7, 2020.
U.S. Appl. No. 17/603,763, filed Oct. 14, 2021, Not Yet Assigned.
U.S. Appl. No. 17/603,785, filed Oct. 14, 2021, Not Yet Assigned.
U.S. Appl. No. 17/603,772, filed Oct. 14, 2021, Not Yet Assigned.
U.S. Appl. No. 17/603,691, filed Oct. 14, 2021, Not Yet Assigned.
U.S. Appl. No. 17/603,792, filed Oct. 14, 2021, Not Yet Assigned.
Chinese Office Action and Search Report for Chinese Application No. 202080029089.8, dated Jun. 29, 2022, with English translation.
Tragon, "Mine Ventilation Technology and Air Conditioning" Coal Industry Press, 1st Edition, May 2014, pp. 93-95 (6 pages total).
U.S. Office Action for U.S. Appl. No. 17/603,792, dated Jun. 21, 2023.
International Preliminary Report on Patentability and English translation of the Written Opinion of the International Searching Authority for International Application No. PCT/JP2020/016619, dated Oct. 28, 2021.

* cited by examiner

AIR CONDITIONING SYSTEM

TECHNICAL FIELD

The present disclosure relates to an air conditioning system including a plurality of fan units.

BACKGROUND ART

Conventional air conditioning systems configured to condition air in a building include an air conditioning system described in Patent Literature 1 (JP H11-132489 A) or the like, which is configured to supply, with use of ducts, a plurality of places in a building with conditioned air obtained by heat exchange in a utilization heat exchanger.

SUMMARY OF THE INVENTION

Technical Problem

Patent Literature 1, however, does not describe relation between consideration of heat source operation in the air conditioning system and heat exchange in the utilization heat exchanger. The heat source operation may stop or be in trouble due to airflow volume through the utilization heat exchanger.

Such an air conditioning system configured to supply a plurality of places in a building with conditioned air with use of ducts has a task of inhibiting malfunction of the air conditioning system due to airflow volume through a utilization heat exchanger.

Solutions to Problem

An air conditioning system according to a first aspect includes a heat exchanger unit having a utilization heat exchanger, and is configured to generate conditioned air through heat exchange in the utilization heat exchanger and supply an air conditioning target space with the conditioned air through a plurality of distribution flow paths communicating with the heat exchanger unit. The distribution flow paths each include a duct connected to the heat exchanger unit and provided for distribution of the conditioned air, and a fan unit provided correspondingly to the duct and configured to supply the air conditioning target space with the conditioned air from the heat exchanger unit through the duct, as well as an actuator configured to individually change supply air volume of the conditioned air supplied to the air conditioning target space. The air conditioning system includes a main controller configured to control the actuators such that airflow volume through the utilization heat exchanger satisfies a predetermined condition.

In the air conditioning system according to the first aspect, the main controller controls the actuators such that the airflow volume through the utilization heat exchanger satisfies the predetermined condition. This configuration inhibits malfunction of the air conditioning system by means of the airflow volume through the utilization heat exchanger.

An air conditioning system according to a second aspect is the system according to the first aspect, in which at least either the ducts or the fan units each include an airflow volume sensing unit. The main controller is configured to total airflow volume through the distribution flow paths detected by the airflow volume sensing units and control the actuators such that a total satisfies the predetermined condition.

In the air conditioning system according to the second aspect, the main controller can accurately obtain the airflow volume through the utilization heat exchanger and can accurately inhibit heat source malfunction.

An air conditioning system according to a third aspect is the system according to the second aspect, in which the actuators are fan motors of the fan units. The main controller controls numbers of revolutions of the fan motors in accordance with values of the airflow volume sensing units.

In the air conditioning system according to the third aspect, the numbers of revolutions of the plurality of fan motors are controlled in accordance with the values of the airflow volume sensing units, and the main controller can thus easily control such that the airflow volume through the utilization heat exchanger satisfies the predetermined condition.

An air conditioning system according to a fourth aspect is the system according to the second or third aspect, in which each of the actuators is an opening-closing device configured to adjust an opening degree of a damper included in each of the fan units, and the main controller controls the opening degree of the damper by means of the opening-closing device in accordance with the value of the airflow volume sensing unit.

In the air conditioning system according to the fourth aspect, the main controller controls the opening degrees of the dampers by means of the opening-closing devices in accordance with values of the airflow volume sensing units. This configuration facilitates control such that the airflow volume through the utilization heat exchanger satisfies the predetermined condition.

An air conditioning system according to a fifth aspect is the system according to any one of the first to fourth aspects, in which the predetermined condition is to cause the airflow volume through the utilization heat exchanger to be a predetermined value or more.

In the air conditioning system according to the fifth aspect, the actuators are controlled such that the airflow volume through the utilization heat exchanger is the predetermined value or more. This configuration inhibits malfunction of the air conditioning system, which is caused by insufficient heat exchange in the utilization heat exchanger due to the airflow volume through the utilization heat exchanger being less than the predetermined value.

An air conditioning system according to a sixth aspect is the system according to the fifth aspect, and the air conditioning system further includes a heat source device connected to the utilization heat exchanger, including a compressor, and constituting a refrigerant circuit configured to achieve a vapor compression refrigeration cycle along with the utilization heat exchanger. The main controller links control of the actuators with control of the refrigerant circuit.

The air conditioning system according to the sixth aspect links control of the actuators with control of the refrigerant circuit, and can thus appropriately control the airflow volume through the utilization heat exchanger by means of the actuators in accordance with a state of the refrigerant circuit, to achieve efficient operation.

An air conditioning system according to a seventh aspect is the system according to the sixth aspect, in which the predetermined value is set to vary in accordance with a parameter of the heat source device influencing a state or circulation volume of a refrigerant circulating in the refrigerant circuit.

The air conditioning system according to the seventh aspect causes the utilization heat exchanger to exchange heat suitably for the state or the circulation volume of the refrigerant circulating in the refrigerant circuit, to achieve an appropriate state of the refrigerant passing the utilization heat exchanger and inhibit malfunction of the heat source device.

An air conditioning system according to an eighth aspect is the air conditioning system according to the seventh aspect, in which the parameter has a value relevant to the circulation volume.

The air conditioning system according to the eighth aspect causes the utilization heat exchanger to exchange heat at the predetermined value of the appropriate airflow volume suitable for the circulation volume of the refrigerant circulating in the refrigerant circuit, to inhibit malfunction of the heat source device.

An air conditioning system according to a ninth aspect is the system according to the seventh aspect, in which the parameter includes at least one of condensation temperature of the refrigerant circuit, evaporation temperature of the refrigerant circuit, heat exchanger temperature of the utilization heat exchanger, an operating frequency of the compressor, combination of inlet temperature and outlet temperature of the utilization heat exchanger, and combination of inlet pressure and the outlet temperature of the utilization heat exchanger.

The air conditioning system according to the ninth aspect causes the utilization heat exchanger to exchange heat suitably for the state or the circulation volume of the refrigerant circulating in the refrigerant circuit to suppress energy consumption of the air conditioning system.

An air conditioning system according to a tenth aspect is the system according to any one of the fifth to ninth aspects, in which the main controller activates the fan unit being stopped when the airflow volume through the utilization heat exchanger is less than the predetermined value in accordance with a command to reduce airflow volume of the fan unit.

The air conditioning system according to the tenth aspect can suppress increase in airflow volume per fan unit, and can avoid a partial temperature gap from desired temperature in the air conditioning target space.

An air conditioning system according to an eleventh aspect is the system according to any one of the fifth to tenth aspects, in which the main controller increases airflow volume of the fan unit when the airflow volume through the utilization heat exchanger is less than the predetermined value in accordance with a command to reduce the airflow volume of the fan unit.

The air conditioning system according to the eleventh aspect allocates the airflow volume to each operating one of the fan units, with no need to operate the fan unit commanded to stop. This configuration reliably stops the fan unit for a place desired to stop air conditioning, and inhibits the air conditioning system from operating not in accordance with a user request.

DESCRIPTION OF EMBODIMENTS

First Embodiment (1) Entire Configuration

Figure 1:
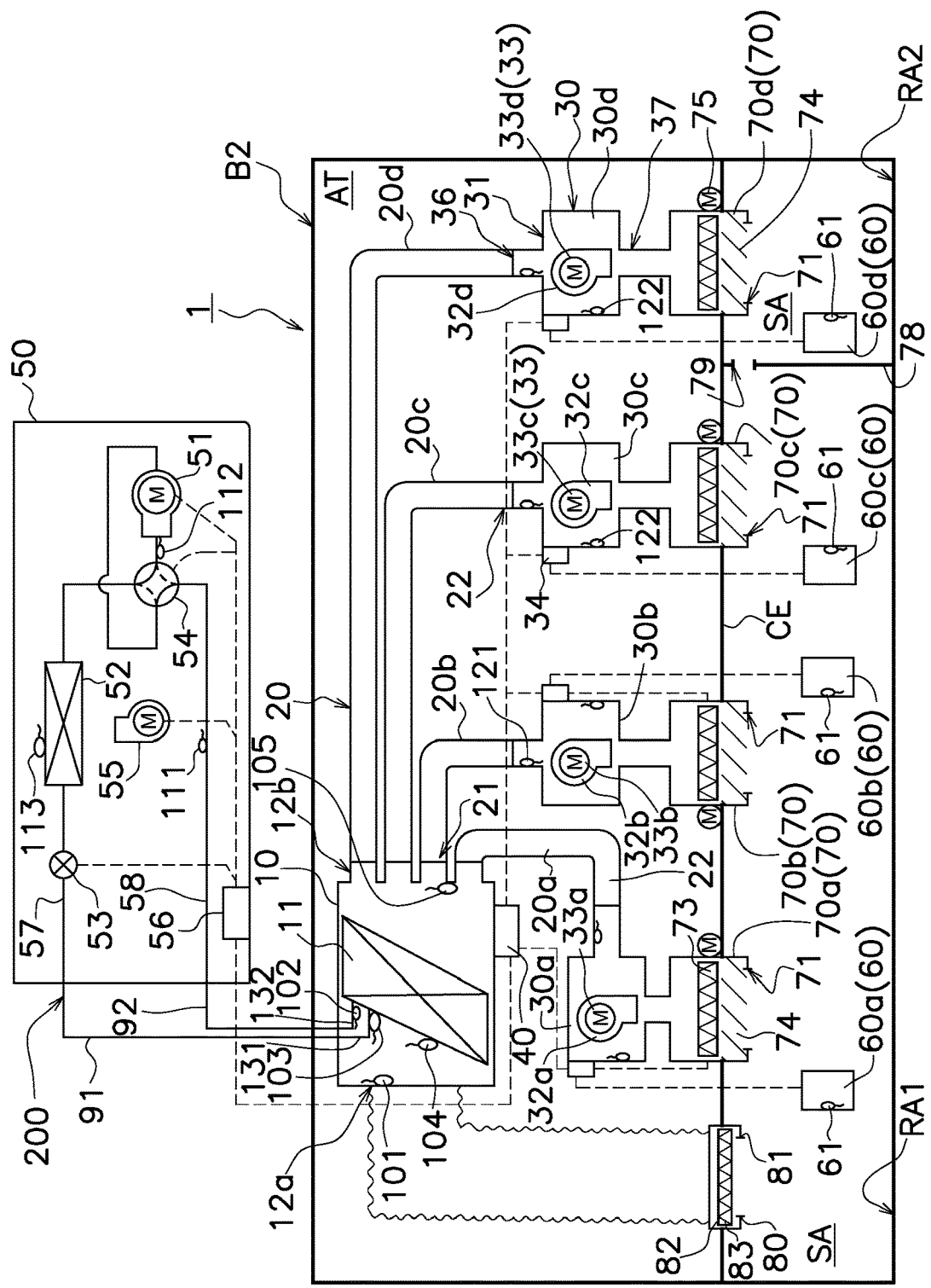
FIG. 1 is a schematic diagram depicting an outline configuration of an air conditioning system.

FIG. 1 depicts an air conditioning system 1 configured to supply an air conditioning target space SA with conditioned air. Examples of the air conditioning target space SA include rooms RA1 and RA2 in a building BL. Description is made to the case where the air conditioning target space SA includes the two rooms RA1 and RA2. The air conditioning system 1 is adapted for rooms having various sizes and various shapes, as well as for any number of rooms. The air conditioning target space SA to be supplied with conditioned air from the air conditioning system 1 has a circumference (front, rear, upper, lower, right, and left ends) preferably surrounded with wall surfaces like the rooms RA1 and RA2. The air conditioning target space SA is not limited to the rooms RA1 and RA2, but may alternatively include a passage, stairs, an entrance, or the like.

As depicted in FIG. 1, the air conditioning system 1 includes a heat exchanger unit 10 having a utilization heat exchanger 11, and a main controller 40. The air conditioning system 1 generates conditioned air through heat exchange in the utilization heat exchanger 11, and supplies the air conditioning target space SA with the conditioned air through a plurality of distribution flow paths communicating with the heat exchanger unit 10. The distribution flow paths each include a duct 20 connected to the heat exchanger unit 10 and provided for distribution of conditioned air, and a fan unit 30 provided correspondingly to the duct 20 and configured to supply the air conditioning target space SA with conditioned air from the heat exchanger unit 10 through the duct 20. Each of the distribution flow paths further includes an actuator configured to individually change supply air volume of conditioned air supplied to the air conditioning target space SA.

For distinction between the plurality of ducts 20, the reference sign additionally includes an alphabet subscript such as 20a. In this case, the ducts 20 include four ducts 20a to 20d. Similarly, the fan units 30 include four fan units 30a to 30d. Furthermore, there are provided blow-out port units 70 and remote controllers 60 including four blow-out port units 70a to 70d and four remote controllers 60a to 60d, respectively.

The heat exchanger unit 10 has a function of generating conditioned air through heat exchange in the utilization heat exchanger 11. Each of the ducts 20 has a first end 21 connected to the heat exchanger unit 10. The plurality of ducts 20 is a plurality of pipes provided to send conditioned air generated by the heat exchanger unit 10, and has a function of distributing conditioned air.

The plurality of fan units 30 is connected to second ends 22 of the plurality of ducts 20. In this case, one of the ducts 20a connected to the heat exchanger unit 10 is connected with the corresponding single fan unit 30a. Similarly, the fan units 30b to 30d are connected to the corresponding ducts 20b to 20d, respectively. Description is made to the case where the ducts 20 each have the single first end 21 and the single second end 22. The single duct 20 may alternatively be branched to have a single first end 21 and a plurality of second ends 22. In this case, the fan units 30 may be respectively connected to the plurality of second ends 22 thus branched. The fan units 30a to 30d are connected to the blow-out port units 70a to 70d and the remote controllers 60a to 60d.

The air conditioning system 1 includes a plurality of air outlet 71 disposed in the air conditioning target space SA. Each of the fan units 30 supplies a corresponding one of the air outlet 71 with conditioned air. In order to supply the air outlet 71 with conditioned air, the fan units 30 suck conditioned air from the heat exchanger unit 10 through the ducts 20. Each of the fan units 30 includes a fan 32 accommodated in a casing 31 of the fan unit 30 in order to suck conditioned air. Each of the fans 32 sends air from the second end 22 of the corresponding duct 20 toward the corresponding blow-out port 71. Each of the fan units 30 may include a single or a plurality of fans 32. In this case, the casings 31 of the fan units 30a to 30d accommodate fans 32a to 32d one by one.

The air conditioning system 1 is configured to individually change, by means of the actuators, the supply air volume of conditioned air supplied to the air outlet 71. In this case, each of the actuators is a fan motor 33 having a variable rotation speed. There are provided four fan motors 33a to 33d having individually variable numbers of revolutions in this case. The fan motors 33a to 33d are individually varied in the numbers of revolutions to achieve individual change in supply air volume of the fan units 30a to 30d.

The main controller 40 in the air conditioning system 1 transmits commands on increase or decrease in supply air volume to the plurality of actuators. The air conditioning system 1 including the main controller 40 will be described later in terms of its control system.

The air conditioning system 1 further includes, in addition to the configurations described above, a heat source unit 50, the remote controllers 60, the blow-out port units 70, a blow-in port unit 80, and various sensors. The sensors included in the air conditioning system 1 will be described later.

(2) Detailed Configurations (2-1) Heat Exchanger Unit 10

The heat exchanger unit 10 includes the utilization heat exchanger 11, a hollow housing 12 accommodating the utilization heat exchanger 11, and the main controller 40. The housing 12 has a single air inlet port 12a connected to a blow-in port 81, and a plurality of air outlet ports 12b connected to the plurality of ducts 20. Exemplified below is the case where there is provided the single air inlet port 12a. There may alternatively be provided a plurality of air inlet ports 12a. The utilization heat exchanger 11 is exemplarily of a fin and tube type, and causes heat exchange between air passing between heat transfer fins and a refrigerant flowing in a heat transfer tube. When air sucked through the air inlet port 12a passes the utilization heat exchanger 11, heat is exchanged between the air and the refrigerant passing the utilization heat exchanger 11 to generate conditioned air. The conditioned air generated by the utilization heat exchanger 11 is sucked into the ducts 20a and 20b through the air outlet ports 12b.

The heat exchanger unit 10 does not include any fan. The heat exchanger unit 10 can suck air through the air inlet port 12a because the heat exchanger unit 10 has internal negative pressure when all the ducts 20 suck air through the plurality of air outlet ports 12b.

(2-2) Duct 20

The plurality of ducts 20 having the function of distributing conditioned air connects the plurality of air outlet ports 12b of the heat exchanger unit 10 and the plurality of fan units 30. Description is made to the case where the fan units 30 and the blow-out port units 70 are connected directly. Each of the fan units 30 and the corresponding blow-out port unit 70 may alternatively interpose the duct 20 to connect the fan unit 30 and the blow-out port unit 70.

Examples of the duct 20 may include a metal pipe having a fixed shape, and a pipe made of a freely bent material. The ducts 20 thus configured are connected to enable various dispositions of the heat exchanger unit 10, the plurality of fan units 30, and the plurality of blow-out port units 70.

Figure 2:
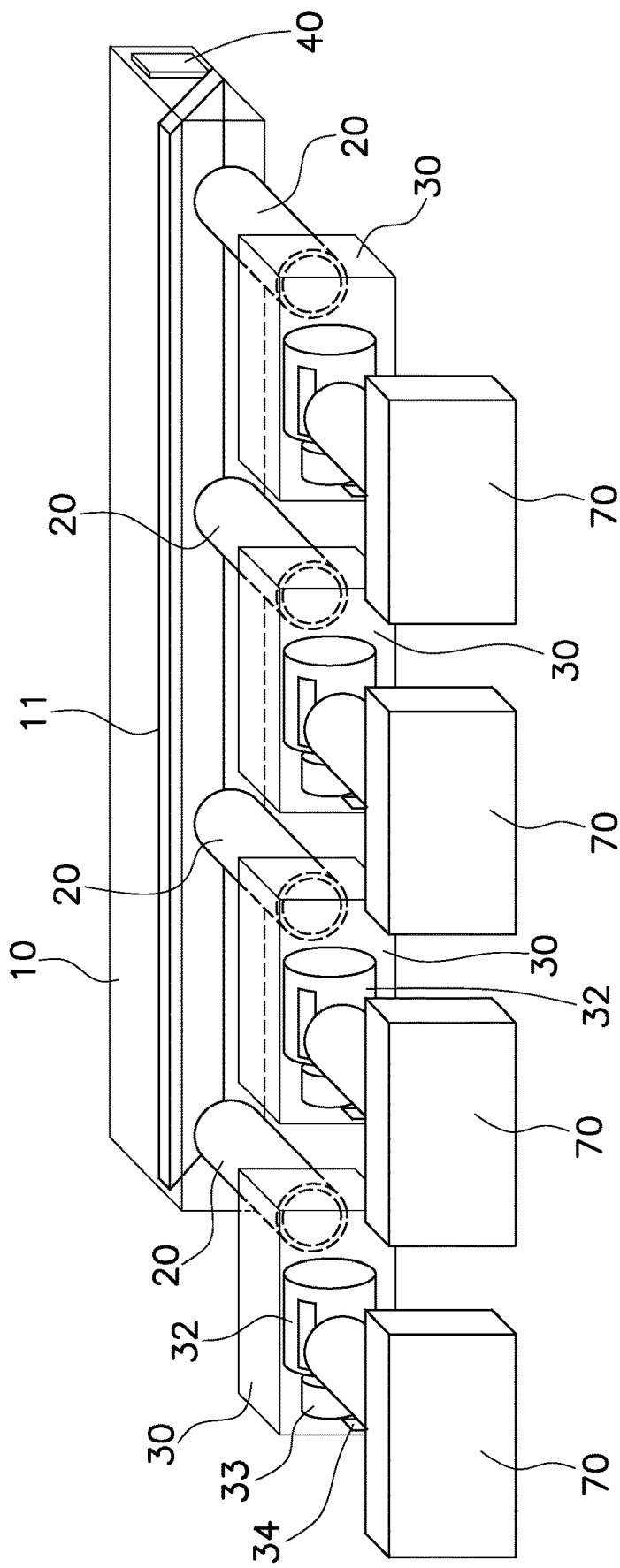
FIG. 2 is a schematic perspective view depicting exemplary connection of a heat exchanger unit, ducts, fan units, and blow-out port units.

FIG. 2 conceptually depicts the heat exchanger unit 10, the four fan units 30, and the four blow-out port units 70 connected in a ceiling space chamber AT. The heat exchanger unit 10, the fan units 30, and the blow-out port units 70 thus configured are easily formed to be thin and may accordingly be disposed in a space below a floor of a room RM1 or RM2.

(2-3) Fan Unit 30

Examples of the fan 32 included in each of the fan units 30 can include a centrifugal fan. Examples of the centrifugal fan adopted as the fan 32 include a sirocco fan. The casing 31 included in each of the fan units 30 has an intake port 36 and an exhaust port 37. The intake port 36 of each of the casings 31 is connected with the second end 22 of a corresponding one of the ducts 20. The exhaust port 37 of each of the casings 31 is connected with a blow-out port of a corresponding one of the fans 32 and is also connected with a corresponding one of the blow-out port units 70. Conditioned air blown out of the fan 32 passes the blow-out port unit 70 and is blown out of the blow-out port 71.

The unit casing 31 is provided with a fan controller 34. All the fan controllers 34 are connected to the main controller 40 in this case.

Figure 3:
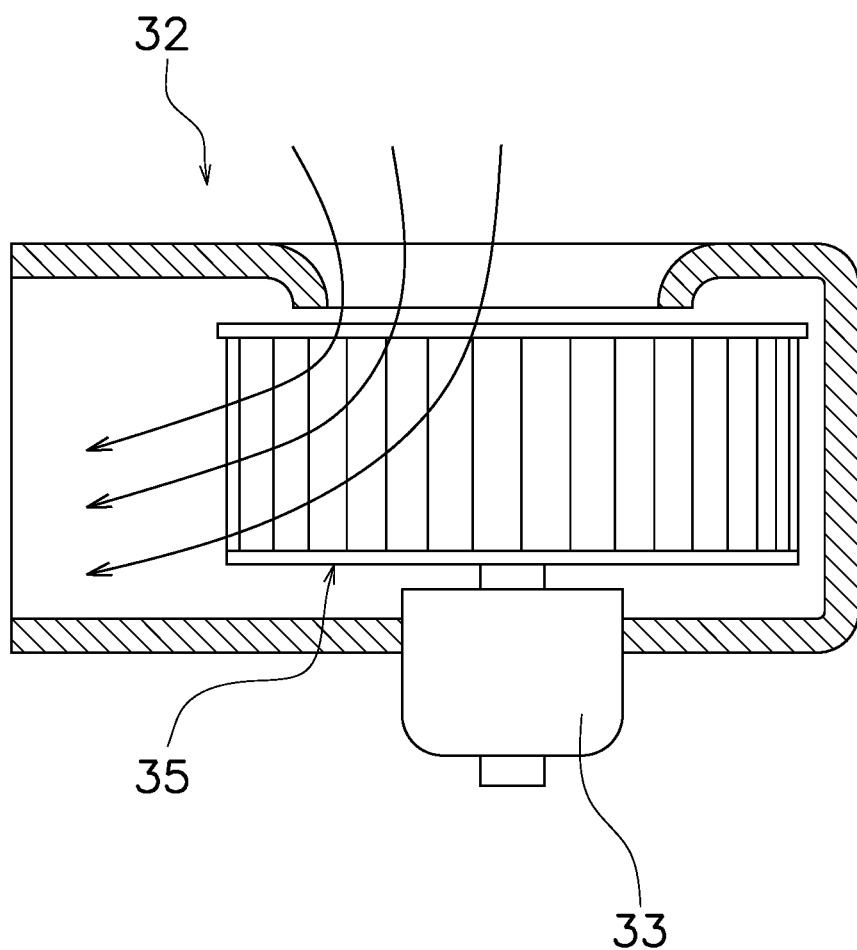
FIG. 3 is a sectional view depicting an exemplary fan included in the fan unit.

FIG. 3 depicts the sirocco fan exemplifying the fan 32. The fan motor 33 configured to rotate a fan rotor 35 of the fan 32 has a variable rotation speed. The fan 32 can thus be changed in supply air volume by change in the rotation speed of the fan motor 33. The fan controllers 34 are each connected to the corresponding fan motor 33 and is configured to control the rotation speed of the fan motor 33.

The fan units 30 each include a differential pressure sensor 121 functioning as an airflow volume sensing unit to be described later, and each of the fan controllers 34 is configured to automatically correct the rotation speed of the fan motor 33 needed to generate necessary supply air volume even if the ducts 20 extending to the fan units 30 generate air resistance varied due to duct lengths. The fan units 30 do not need to have such a correcting function in some cases.

(2-4) Heat Source Unit 50

The heat source unit 50 supplies heat energy necessary for heat exchange in the utilization heat exchanger 11 in the heat exchanger unit 10. In the air conditioning system 1 depicted in FIG. 1, a refrigerant circulates between the heat source unit 50 and the heat exchanger unit 10 to achieve a vapor compression refrigeration cycle. The heat source unit 50 and the heat exchanger unit 10 constitute a refrigeration cycle apparatus configured to achieve the vapor compression refrigeration cycle. FIG. 1 exemplifies the heat source unit 50 that is disposed outside the building BL and utilizes outdoor air as a heat source. However, the heat source unit 50 can be disposed at a place not limited to the outside of the building BL.

The heat source unit 50 includes a compressor 51, a heat source heat exchanger 52, an expansion valve 53, a four-way valve 54, a heat source fan 55, a heat source controller 56, and in-unit refrigerant pipes 57 and 58. The compressor 51 has a discharge port connected to a first port of the four-way valve 54, and a suction port connected to a third port of the four-way valve 54. The compressor 51 compresses a gaseous refrigerant (hereinafter, also referred to as a gas refrigerant) or a refrigerant in a gas-liquid two-phase state sucked through the suction port, and discharges the compressed refrigerant from the discharge port. The compressor 51 incorporates a compressor motor configured to change a rotation speed (or an operating frequency) through inverter control or the like. The compressor 51 is configured to change the operating frequency so as to change discharge volume per unit time of a discharged refrigerant.

The four-way valve 54 has a second port connected with a first inlet-outlet port of the heat source heat exchanger 52, and a fourth port connected with the in-unit refrigerant pipe 58. During cooling operation, the four-way valve 54 causes the refrigerant to flow, as indicated by a solid line, from the first port to the second port, be discharged from the compressor 51, be sent to the heat source heat exchanger 52, flow from the utilization heat exchanger 11 through an in-unit refrigerant pipe 132, a connection pipe 92, and the in-unit refrigerant pipe 58, flow from the fourth port to the third port, and then be sent to the suction port of the compressor 51. During heating operation, the four-way valve 54 causes the refrigerant to flow, as indicated by a broken line, from the first port to the fourth port, be discharged from the compressor 51, be sent to the utilization heat exchanger 11 through the in-unit refrigerant pipe 58, the connection pipe 92, and the in-unit refrigerant pipe 132, flow from the second port to the third port, and be sent from the heat source heat exchanger 52 to the suction port of the compressor 51. The heat source heat exchanger 52 is exemplarily of a fin and tube type, and causes heat exchange between air passing between heat transfer fins and a refrigerant flowing in a heat transfer tube.

The heat source heat exchanger 52 has a second inlet-outlet port connected to a first end of the expansion valve 53, and a second end of the expansion valve 53 is connected to a first inlet-outlet port of the utilization heat exchanger 11 via the in-unit refrigerant pipe 57, a connection pipe 91, and an in-unit refrigerant pipe 131. The utilization heat exchanger 11 has a second inlet-outlet port connected to the in-unit refrigerant pipe 132.

The heat source unit 50 and the heat exchanger unit 10 thus configured are connected to constitute a refrigerant circuit 200. During cooling operation, the refrigerant flows, in the refrigerant circuit 200, to the compressor 51, the four-way valve 54, the heat source heat exchanger 52, the expansion valve 53, the utilization heat exchanger 11, the four-way valve 54, and the compressor 51 in the mentioned order. During heating operation, the refrigerant flows, in the refrigerant circuit 200, to the compressor 51, the four-way valve 54, the utilization heat exchanger 11, the expansion valve 53, the heat source heat exchanger 52, the four-way valve 54, and the compressor 51 in the mentioned order.

(2-4-1) Circulation of Refrigerant During Cooling Operation

During cooling operation, a gas refrigerant compressed by the compressor 51 is sent to the heat source heat exchanger 52 through the four-way valve 54. This refrigerant radiates heat in the heat source heat exchanger 52 to air blown by the heat source fan 55, is expanded at the expansion valve 53 to be decompressed, flows through the in-unit refrigerant pipe 57, the connection pipe 91, and the in-unit refrigerant pipe 131, and is sent to the utilization heat exchanger 11. The refrigerant sent from the expansion valve 53 and having low temperature and low pressure exchanges heat in the utilization heat exchanger 11 to absorb heat from air sent from the blow-in port 81. A gas refrigerant or a gas-liquid two-phase refrigerant having exchanged heat in the utilization heat exchanger 11 flows through the in-unit refrigerant pipe 132, the connection pipe 92, the in-unit refrigerant pipe 58, and the four-way valve 54, and is sucked to the compressor 51. Conditioned air reduced in heat in the utilization heat exchanger 11 is blown out to the rooms RA1 and RA2 through the plurality of ducts 20, the plurality of fan units 30, and the plurality of air outlet 71, so as to cool the rooms RA1 and RA2.

During cooling operation, the expansion valve 53 is controlled to be adjusted in opening degree to cause, for example, a degree of superheating of the refrigerant sucked to the suction port of the compressor 51 to match a degree of superheating target value, in order to avoid liquid compression at the compressor 51. Furthermore, the operating frequency of the compressor 51 is controlled to change so as to achieve cooling load processing while the expansion valve 53 is adjusted in opening degree. The degree of superheating is exemplarily calculated by subtracting evaporation temperature of the refrigerant in the utilization heat exchanger 11 from temperature of the gas refrigerant sent from the utilization heat exchanger.

(2-4-2) Circulation of Refrigerant During Heating Operation

During heating operation, the gas refrigerant compressed by the compressor 51 flows through the four-way valve 54, the in-unit refrigerant pipe 58, the connection pipe 92, and the in-unit refrigerant pipe 132, and is sent to the utilization heat exchanger 11. This refrigerant exchanges heat in the utilization heat exchanger 11 to give heat to air sent from the blow-in port 81. The refrigerant having exchanged heat in the utilization heat exchanger 11 flows through the in-unit refrigerant pipe 131, the connection pipe 91, and the in-unit refrigerant pipe 57, and is sent to the expansion valve 53. The refrigerant expanded and decompressed by the expansion valve 53 and having low temperature and low pressure is sent to the heat source heat exchanger 52, and exchanges heat in the heat source heat exchanger 52 to absorb heat from air blown by the heat source fan 55. A gas refrigerant or a gas-liquid two-phase refrigerant having exchanged heat in the heat source heat exchanger 52 flows through the four-way valve 54 and is sucked to the compressor 51. Conditioned air obtained heat in the utilization heat exchanger 11 is blown out to the rooms RA1 and RA2 through the plurality of ducts 20, the plurality of fan units 30, and the plurality of air outlet 71, so as to heat the rooms RA1 and RA2.

During heating operation, the expansion valve 53 is controlled to be adjusted in opening degree to cause, for example, the refrigerant at an outlet port of the utilization heat exchanger 11 (the in-unit refrigerant pipe 131) to have a degree of subcooling matching a target value. Furthermore, the operating frequency of the compressor 51 is controlled to change so as to achieve heating load processing while the expansion valve 53 is adjusted in opening degree.

The degree of subcooling of the utilization heat exchanger 11 is exemplarily calculated by subtracting temperature of a liquid refrigerant exiting the utilization heat exchanger 11 from condensation temperature of the refrigerant in the utilization heat exchanger 11.

Each of the blow-out port units 70 is attached to a ceiling CE with the blow-out port 71 exemplarily directed downward. The blow-out port unit 70 is exemplarily attached to the ceiling CE in this case. The blow-out port unit 70 may alternatively be attached to a wall or the like, with no limitation to the ceiling CE in terms of an attachment place of the blow-out port unit 70.

(2-5) Blow-Out Port Unit 70

The blow-out port units 70 each include a hollow casing 72 accommodating an air filter 73. The blow-out port units 70a to 70d are connected to the fan units 30a to 30d, respectively. Conditioned air sent from the fan unit 30 passes the air filter 73 and is blown out of the blow-out port 71. Description is made to the case where the blow-out port units 70 each include the air filter 73. Each of the blow-out port units 70 may not alternatively include the air filter 73.

Each of the blow-out port units 70 includes a wind direction plate 74 accommodated in the hollow casing 72. The blow-out port unit 70 includes a wind direction plate motor 75 configured to drive the wind direction plate 74. The wind direction plate motor 75 configured to drive the wind direction plate 74 is an actuator in this case. The wind direction plate 74 can be moved by the wind direction plate motor 75 to adjust a wind direction. The wind direction plate 74 can also be moved to be positioned so as to shut the blow-out port 71. The wind direction plate motor 75 is connected to the fan controller 34 of the fan unit 30 or the like. The fan controller 34 can thus control the wind direction as well as can control to open or close the blow-out port 71. Description is made to the case where the blow-out port units 70 each include the wind direction plate 74 and the wind direction plate motor 75. Each of the blow-out port units 70 may not alternatively include the wind direction plate 74 or the wind direction plate motor 75.

The blow-in port unit 80 is attached to the ceiling CE with the blow-in port 81 exemplarily directed toward the air conditioning target space SA. The blow-in port unit 80 is exemplarily attached to the ceiling CE in this case. The blow-in port unit 80 may alternatively be attached to a wall of the building BL, with no limitation to the ceiling CE in terms of an attachment place of the blow-in port unit 80.

The blow-in port unit 80 includes a hollow casing 82 accommodating an air filter 83. Air sent to the heat exchanger unit 10 passes the air filter 83 and is imported through the blow-in port 81. Description is made to the case where the blow-in port unit 80 includes the air filter 83. The blow-in port unit 80 may not alternatively include the air filter 83.

(2-6) Control System

Figure 4:
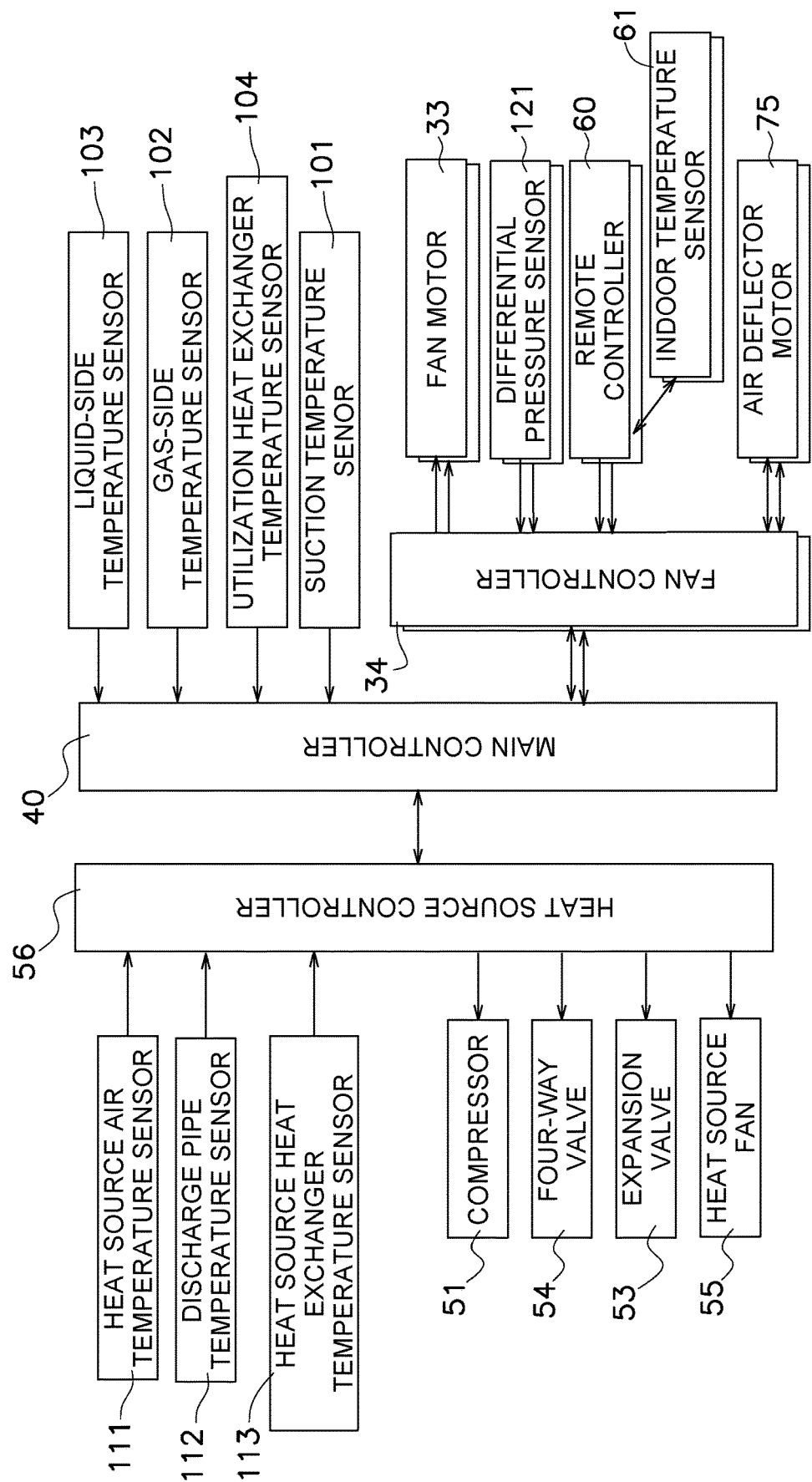
FIG. 4 is a block diagram depicting an exemplary control system.

As depicted in FIG. 4, the main controller 40 is connected to the plurality of fan controllers 34 and the heat source controller 56. The heat source controller 56 is exemplarily constituted by various circuits mounted on a printed circuit board connected to various devices included in the heat source unit 50, and controls the various devices in the heat source unit 50, such as the compressor 51, the expansion valve 53, the four-way valve 54, and the heat source fan 55. The main controller 40 is connected to the remote controllers 60 via the fan controllers 34. The remote controllers 60a to 60d correspond to the blow-out port units 70a to 70d and are connected to the fan units 30a to 30d. Description is made to the case where the remote controllers 60 are connected to the main controller 40 via the fan controllers 34. The remote controllers 60 may alternatively be connected directly to the main controller 40. Exemplified below is the case where the main controller 40, the plurality of fan controllers 34, the heat source controller 56, and the plurality of remote controllers 60 are connected wiredly. All or part of the controllers may alternatively be connected by wireless communication.

The main controller 40, the plurality of fan controllers 34, the heat source controller 56, and the plurality of remote controllers 60 are each embodied by a computer or the like. The computer constituting each of the main controller 40, the plurality of fan controllers 34, the heat source controller 56, and the plurality of remote controllers 60 includes a control computing device and a storage device. Examples of the control computing device can include a processor such as a CPU or a GPU. The control computing device reads a program stored in the storage device and executes predetermined image processing or arithmetic processing in accordance with the program. The control computing device is configured to further write a result of the arithmetic processing to the storage device, and read information stored in the storage device, in accordance with the program. The main controller 40, the plurality of fan controllers 34, the heat source controller 56, and the plurality of remote controllers 60 may alternatively be constituted by an integrated circuit (IC) configured to execute control similar to control with use of a CPU and a memory. Examples of the IC mentioned herein include a large-scale integrated circuit (LSI), an application-specific integrated circuit (ASIC), a gate array, and a field programmable gate array (FPGA).

The heat exchanger unit 10 is provided with a suction temperature sensor 101, a gas-side temperature sensor 102, a liquid-side temperature sensor 103, and a utilization heat exchanger temperature sensor 104. Examples of these temperature sensors or any temperature sensor to be described later can include a thermistor. There may be optionally provided an air outlet temperature sensor 105 configured to detect temperature of air just having passed the utilization heat exchanger 11. The suction temperature sensor 101, the gas-side temperature sensor 102, the liquid-side temperature sensor 103, and the utilization heat exchanger temperature sensor 104 are connected to the main controller 40 and have detection results transmitted to the main controller 40. The suction temperature sensor 101 detects temperature of air sucked through the air inlet port 12a. The gas-side temperature sensor 102 detects temperature of a refrigerant at the first inlet-outlet port of the utilization heat exchanger 11 connected to the in-unit refrigerant pipe 58. The liquid-side temperature sensor 103 detects temperature of a refrigerant at the second inlet-outlet port of the utilization heat exchanger 11 connected to the in-unit refrigerant pipe 57. The utilization heat exchanger temperature sensor 104 detects heat exchanger temperature with a refrigerant in the gas-liquid two-phase state flowing in the utilization heat exchanger 11.

The heat source unit 50 is provided with a heat source air temperature sensor 111, a discharge pipe temperature sensor 112, and a heat source heat exchanger temperature sensor 113. The heat source air temperature sensor 111, the discharge pipe temperature sensor 112, and the heat source heat exchanger temperature sensor 113 are connected to the heat source controller 56. The heat source air temperature sensor 111, the discharge pipe temperature sensor 112, and the heat source heat exchanger temperature sensor 113 have detection results transmitted to the main controller 40 via the heat source controller 56. The heat source air temperature sensor 111 detects temperature of an airflow generated by the heat source fan 55 and just about to pass the heat source heat exchanger 52. The discharge pipe temperature sensor 112 detects temperature of a refrigerant discharged from the compressor 51. The heat source heat exchanger temperature sensor 113 is attached adjacent to a halfway portion of a refrigerant flow path in the heat source heat exchanger 52, and detects heat exchanger temperature with a refrigerant in the gas-liquid two-phase state flowing in the heat source heat exchanger 52.

The fan unit 30 is provided with the differential pressure sensor 121 and a blow-out temperature sensor 122. The differential pressure sensor 121 detects differential pressure between airflows upwind and downwind of a place provided with the fan unit 30 or the like. The differential pressure sensor 121 is connected to the fan controller 34, and transmits, to the fan controller 34, data of the differential pressure thus detected. The differential pressure sensor 121 is attached to a place of a flow path exemplarily having a preliminarily determined sectional area, and the fan controller 34 is configured to calculate supply air volume from a detection value of the differential pressure sensor 121. The differential pressure sensor 121 detects differential pressure to be referred to for detection of a wind direction. The blow-out temperature sensor 122 is exemplarily disposed in the casing 31 of each of the fan units 30, and detects temperature of conditioned air blown out of the fan unit 30. Description is made to the case where the blow-out temperature sensor 122 is disposed in the casing 31 of the fan unit 30. The blow-out temperature sensor 122 may alternatively be disposed at a different place such as an inside of the blow-out port unit 70.

Each of the remote controllers 60 incorporates an indoor temperature sensor 61, and is configured to input a command to turn on or off at least one of the air conditioning system 1 and the fan unit 30, switching between cooling operation and heating operation, set temperature, and set airflow volume. For example, the set temperature is provided to enable input by means of a numerical value, and the set airflow volume is provided to enable input through selection among slight airflow volume, small airflow volume, moderate airflow volume, and large airflow volume. A user uses an input button of the remote controller 60 to select cooling operation, set 28° C. as set temperature, and select moderate airflow volume as set airflow volume.

The main controller 40 calculates, from blow-out temperature detected by each of the blow-out temperature sensors 122 and the set temperature, necessary supply air volume to be blown out of the corresponding fan unit 30, controls the rotation speed of the fan motor 33, and controls to approach a detection value of the indoor temperature sensor 61 to the set temperature.

Exemplarily assume that three fan units 30 are initially connected to the heat exchanger unit 10 and one of the air outlet ports 12b is closed in the heat exchanger unit 10. In order to additionally provide another fan unit 30 in such a case, the duct 20 is connected to the air outlet port 12b having been closed, the additional fan unit 30 is connected to the duct 20, and the blow-out port unit 70 is connected to the fan unit 30 thus added. The fan controller 34 of the fan unit 30 thus added is connected to the main controller 40 to complete a network of the main controller 40 and the four fan units 34, through facilitated construction of the network for transmission of commands from the main controller 40.

(3) Operation of Air Conditioning System 1

In the air conditioning system 1, the set airflow volume inputted from the plurality of remote controllers 60 corresponds to basic supply air volume for determination of supply air volume of the plurality of fan units 30. However, without change in set airflow volume, cooling operation decreases temperature to be lower than the set temperature and heating operation increases temperature to be higher than the set temperature after the temperature reaches the set temperature. In order to converge indoor air temperature to the set temperature in accordance with a command from the main controller 40, the supply air volume of each of the fan units 30 is changed from the set airflow volume. The main controller 40 calculates an air conditioning load from a difference between the indoor air temperature and the set temperature, and determines necessary supply air volume from the air conditioning load and blowing air temperature of each of the fan units 30. The air conditioning load is zero in an exemplary case where the indoor air temperature matches the set temperature without any difference therebetween. The main controller 40 accordingly causes the fan unit 30 having indoor air temperature matching the set temperature to stop blowing air even if the set airflow volume is not zero. Alternatively, in order to prevent an air backflow from the blow-out port 71 toward the heat exchanger unit 10, the fan unit 30 to be stopped in accordance with the air conditioning load may be controlled not to have no supply air volume for inhibition of the backflow.

(3-1) Upon Activation

The fan controllers 34 of the fan units 30a to 30d transmit, to the main controller 40, supply air volume from the fan units 30a to 30d in accordance with the set airflow volume of the four remote controllers 60. When the fan unit 30 being stopped is operating to blow air quite slightly in order to prevent an air backflow from the blow-out port 71 toward the heat exchanger unit 10, the air conditioning system 1 may be configured to add such slight supply air volume to total airflow volume. The air conditioning system 1 may alternatively be configured not to add such slight supply air volume to the total airflow volume.

The main controller 40 totals supply air volume transmitted from all the fan units 30 to calculate total airflow volume through the utilization heat exchanger 11. The main controller 40 calculates temperature of air sucked to the heat exchanger unit 10 with reference to the suction temperature sensor 101 of the heat exchanger unit 10. The main controller 40 requests, to the heat source controller 56 of the heat source unit 50, necessary refrigerant circulation volume calculated from the total airflow volume of air passing the utilization heat exchanger 11 and the air temperature. The heat source controller 56 of the heat source unit 50 changes the operating frequency of the compressor 51 to change the refrigerant circulation volume in accordance with the request from the main controller 40.

(3-2) During Normal Operation

The air conditioning system 1 in normal operation controls differently between a case where the total airflow volume is equal to or more than a lower limit value and a case where the total airflow volume is less than the lower limit value.

Description is made to the case where control is changed in accordance with the lower limit value, although the air conditioning system 1 refers to a value for change in control, which is not limited to the lower limit value. The air conditioning system 1 can be configured to change control between a case where the total airflow volume is equal to or more than a predetermined value and a case where the total airflow volume is less than the predetermined value. As repeated description, the predetermined value may adopt the lower limit value or may adopt a value other than the lower limit value.

(3-2-1) when Total Airflow Volume is Equal to or More than Lower Limit Value

When predetermined time elapses after activation and the system comes into a normal operation state, the main controller 40 determines whether or not the total airflow volume is equal to or more than the lower limit value. The lower limit value will be described later in terms of setting thereof. When the total airflow volume is equal to or more than the lower limit value, the main controller 40 controls the air conditioning system 1 in the following manner.

When predetermined time elapses after activation and the system comes into the normal operation state, the fan controllers 34 are each configured to recalculate individual supply air volume at predetermined intervals. Such recalculation includes calculating an air conditioning load with reference to indoor air temperature sensed by the remote controller 60, in accordance with a situation that the indoor air temperature adjacent to each of the blow-out port units 70 "approaches", "is largely different from" the set temperature, or the like, and each of the fan controllers 34 corrects the set airflow volume. Each of the fan units 30 transmits corrected supply air volume thus obtained to the main controller 40. The main controller 40 may alternatively be configured to execute calculation on correction of set airflow volume. The main controller 40 recalculates supply air volume transmitted from the plurality of fan controllers 34 at each interval to obtain total airflow volume, and requests, to the heat source controller 56 of the heat source unit 50, when the total airflow volume is equal to or more than the lower limit value, necessary refrigerant circulation volume calculated from the total airflow volume of air passing the utilization heat exchanger 11 and the air temperature at each interval. The heat source controller 56 of the heat source unit 50 changes the operating frequency of the compressor 51 to change the refrigerant circulation volume in accordance with the request from the main controller 40.

(3-2-2) when Total Airflow Volume is Less than Lower Limit Value

When the total airflow volume is less than the lower limit value, the main controller 40 calculates a shortfall as a difference between the calculated total airflow volume and the lower limit value. The main controller 40 allocates the shortfall to the plurality of fan units 30 in accordance with a preliminarily determined airflow volume distribution rule. When the shortfall is allocated to the plurality of fan units 30, supply air volume matching the shortfall may be allocated or supply air volume equal to or more than the shortfall may be allocated because the total airflow volume has only to be equal to or more than the lower limit value.

Assume an exemplary case where the lower limit value is 30 m$^3$/min, and the main controller 40 has requests for 16 m$^3$/min from the fan controller 34 of the fan unit 30a, 0 m$^3$/min from the fan controller 34 of the fan unit 30b, 10 m$^3$/min from the fan controller 34 of the fan unit 30c, and 6 m$^3$/min from the fan controller 34 of the fan unit 30d. In this case, the main controller 40 calculates total airflow volume of 32 m$^3$/min>30 m$^3$/min, and determines that the total airflow volume is more than the lower limit value.

When the fan controller 34 of the fan unit 30c subsequently receives a command to stop blowing from the remote controller 60, the fan controller 34 of the fan unit 30c changes the request from 10 m$^3$/min to 0 m$^3$/min. The total airflow volume then decreases from 32 m$^3$/min to 22 m$^3$/min. The main controller 40 thus determines that there is commanded to change the total airflow volume to be equal to or less than the lower limit value.

In an exemplary case of having determined that there is commanded to change to be equal to or less than the lower limit value, the main controller 40 may allocate the shortfall equally to the fan units 30 in operation. In the above case, 8 (=30−22) m$^3$/min is allocated to the fan unit 30a by 4 m$^3$/min and is allocated to the fan unit 30b by 4 m$^3$/min, so that the fan unit 30a is changed to 20 m$^3$/min and the fan unit 30d is changed to 10 m$^3$/min.

In another exemplary case of having determined that there is commanded to change to be equal to or less than the lower limit value, the main controller 40 may allocate the shortfall equally to all the fan units 30. In the above case, 8 (=30−22) m$^3$/min is allocated to each of the fan units 30a to 30d by 2 m$^3$/min, so that the fan unit 30a is changed to 18 m$^3$/min, the fan unit 30b is changed to 2 m$^3$/min, the fan unit 30b is changed to 2 m$^3$/min, and the fan unit 30d is changed to 8 m$^3$/min.

(3-2-3) Setting of Lower Limit Value

The lower limit value of the total airflow volume of the air conditioning system 1 is determined by the main controller 40 in accordance with heat exchanger temperature or the like. At high heat exchanger temperature during cooling operation, the main controller 40 determines that the heat source unit 50 has insufficient heat energy supply capacity and sets a high lower limit value of the total airflow volume. In comparison to such a case, at low heat exchanger temperature during cooling operation, the main controller 40 determines that the heat source unit 50 has sufficient heat energy supply capacity and sets a lower limit value of the total airflow volume less than the lower limit value in the above case. The lower limit value may be specifically determined through at least one of an actual test and a simulation of the air conditioning system 1.

(3-2-4) Detection of Air Backflow

Assume that, in the distribution flow path including the duct 20a, the fan unit 30a, and the blow-out port unit 70a, a normal airflow travels from the heat exchanger unit 10 toward the blow-out port 71 whereas an abnormal airflow as an air backflow travels from the blow-out port 71 toward the heat exchanger unit 10. Similarly in each of the distribution flow paths including the ducts 20b to 20d, the fan units 30b to 30d, and the blow-out port units 70b to 70d, an air backflow travels from the blow-out port 71 toward the heat exchanger unit 10. The single differential pressure sensor 121 provided at each of the fan units 30a to 30d has a detection result transmitted to the main controller 40 via the fan controller 34.

The main controller 40 determines that an airflow is normal in a case where the exhaust port 37 is lower in air pressure than the intake port 36 of each of the fan units 30a to 30d, and determines that there is an air backflow in another case where the exhaust port 37 is higher in air pressure than the intake port 36 of each of the fan units 30a to 30d.

(3-2-5) Operation During Occurrence of Air Backflow

The main controller 40 eliminates an air backflow in cooperation with the fan units 30. Specifically, the main controller 40 senses the fan unit 30 connected to the distribution flow path having an air backflow. The main controller 40 transmits a command to increase the rotation speed of the fan motor 33 to the fan controller 34 of the fan unit 30 on the distribution flow path having the air backflow. In an exemplary case where the fan motor 33 is stopped, the main controller 40 transmits a command to start driving at a preliminarily determined rotation speed. In another case where the fan motor 33 is rotating at low speed, the main controller 40 transmits a command to further increase the rotation speed of the fan motor 33.

When the wind direction plate 74 is configured to change air resistance, the wind direction plate 74 may alternatively be adopted to eliminate an air backflow. When the fan motor 33 is stopped, the wind direction plate 74 of the blow-out port unit 70 having an air backflow may be fully closed. When the fan motor 33 is rotating at low speed, the main controller 40 may be configured to transmit a command to further increase the rotation speed of the fan motor 33 as well as increase the air resistance at the wind direction plate 74.

Still alternatively, the distribution flow path may be provided therein with a backflow preventing damper that is fully closed only by force of an air backflow. In this case, backflow prevention can be achieved even without any command from the main controller 40.

(4) Modification Examples

(4-1) Modification Example 1A

The first embodiment described above refers to the case where the ducts 20 are connected directly to the heat exchanger unit 10. The ducts 20 may alternatively be connected indirectly to the heat exchanger unit 10. For example, the ducts 20 and the heat exchanger unit 10 may alternatively interpose an attachment having a plurality of air outlet ports for connection of the ducts 20 to the heat exchanger unit 10. There may be prepared plural types of attachments different in the number of connectable ducts 20, to enable change in the number of the ducts 20 connectable to the heat exchanger unit 10 of an identical type.

(4-2) Modification Example 1B

The first embodiment described above refers to the case where the single blow-out port unit 70 is connected to the single fan unit 30. Alternatively, a plurality of blow-out port units 70 may be connected to the single fan unit 30. That is, the single fan unit 30 may be provided with a plurality of air outlet ports 71. In this case, each of the blow-out port units 70 may be provided with a single remote controller 60, to connect a plurality of remote controllers 60 to each of the fan units 30.

(4-3) Modification Example 1C

The first embodiment described above refers to the case where a wall between the rooms RA1 and RA2 is provided with a vent hole 79 and the single blow-in port 81 is provided. The blow-in port 81 is not limited to one in terms of the number thereof, but there may alternatively be provided a plurality of blow-in ports 81. Furthermore, a plurality of blow-in ports 81 may be provided at the identical room RA1 or may be provided at both of the different rooms RA1 and RA2. There is no need to provide any vent hole 79 when the blow-in port 81 is provided at each of the rooms RA1 and RA2.

(4-4) Modification Example 1D

The fan unit 30 connected to the second end 22 of the duct 20 having the first end 21 connected to the heat exchanger unit 10 may further be connected with another duct 20 and another fan unit 30.

For example, a single distribution flow path may be connected in series with a plurality of fan units 30. According to an exemplary aspect of such connection, two ducts 20, two fan units 30, and a single blow-out port unit 70 are connected in series in the order of the heat exchanger unit 10, the duct 20, the fan unit 30, the duct 20, the fan unit 30, and the blow-out port unit 70. Provision of a plurality of power sources on a single distribution flow path enables setting a longer distance from the heat exchanger unit 10 to the blow-out port 71 in comparison to a case of providing only one of the power sources configured similarly.

(4-5) Modification Example 1E

The first embodiment described above refers to the case where the single heat exchanger unit 10 is connected to the single heat source unit 50. Connection between the heat source unit 50 and the heat exchanger unit 10 is not limited to such a connection aspect. Alternatively, a plurality of heat exchanger units 10 may be connected to the single heat source unit 50. Still alternatively, a plurality of heat source units 50 may be connected to a plurality of heat exchanger units 10. According to these connection aspects, the heat exchanger units 10 may be each provided with a flow rate adjuster configured to adjust a flow rate of a refrigerant flowing in the utilization heat exchanger 11. Examples of the flow rate adjuster include a flow rate control valve having a variable valve opening degree. When the single refrigerant circuit 200 includes a plurality of heat exchanger units 10 and the refrigerant circuit 200 is provided therein with a refrigerant system configured to circulate a refrigerant in a specific one of the heat exchanger units 10, the specific heat exchanger unit 10 has the lower limit value of airflow volume through the utilization heat exchanger 11, and the lower limit value may be set to vary in accordance with a parameter influencing a state or circulation volume of a refrigerant circulating in the refrigerant system.

(4-6) Modification Example 1F

The first embodiment described above refers to the case where the compressor 51 in the heat source unit 50 is of the type having a variable rotation speed. The compressor 51 in the heat source unit 50 may alternatively be of a type having a nonvariable rotation speed.

(4-7) Modification Example 1G

The first embodiment described above refers to the case where the air conditioning system 1 is configured to switch between cooling operation and heating operation. The technical concept according to the first embodiment is also applicable to an air conditioning system dedicated to cooling operation or heating operation.

(4-8) Modification Example 1H

The first embodiment described above refers to the case where the heat source unit 50 and the heat exchanger unit 10 are connected to constitute the refrigeration cycle apparatus allowing the refrigerant to flow to the utilization heat exchanger 11. The heat source unit 50 is not limitedly connected to the heat exchanger unit 10 to constitute the refrigeration cycle apparatus. The heat source unit configured to supply the utilization heat exchanger 11 with heat energy may alternatively be configured to supply a heating medium such as at least one of warm water and cold water.

When the heat source unit is configured to supply a heating medium to the utilization heat exchanger 11, the heat exchanger unit 10 may be provided with a flow rate adjuster configured to adjust a flow rate of the heating medium flowing to the utilization heat exchanger 11.

When the heat exchanger unit 10 is connected to the heat source unit configured to supply the heating medium, a single heat source unit may be connected with a plurality of heat exchanger units 10.

(4-9) Modification Example 1I

The first embodiment described above refers to the case where the main controller 40 requests, upon activation, the refrigerant circulation volume necessary for the refrigerant circuit 200, calculated from the obtained total airflow volume of air passing the utilization heat exchanger 11 and the calculated temperature of air sucked into the heat exchanger unit 10. The necessary refrigerant circulation volume requested by the main controller 40 is determined in a manner not limited to the above.

For example, the air conditioning system 1 may be configured as follows. Upon activation, the main controller 40 totals supply air volume transmitted from all the fan units 30 to calculate total airflow volume through the utilization heat exchanger 11. The main controller 40 stores, in an internal memory or the like, an airflow volume table indicating a relation between total airflow volume and necessary refrigerant circulation volume. The main controller 40 selects airflow volume closest to the calculated total airflow volume, from among airflow volume included in the airflow volume table. The main controller 40 requests, to the heat source controller 56, refrigerant circulation volume corresponding to the total airflow volume selected from the airflow volume table. As to a difference between the airflow volume selected from the airflow volume table and the total airflow volume, the air conditioning system 1 may be configured such that the main controller 40 transmits a command to the fan controller 34 to change supply air volume correspondingly to the difference in each of the fan units 30.

The air conditioning system 1 may alternatively be configured as follows. Upon activation, the main controller 40 receives set temperature of the remote controller 60 via the fan controller 34. The main controller 40 further receives indoor air temperature detected by the remote controller 60, indoor air temperature calculated from a detection value of the suction temperature sensor 101, or indoor air temperature from an indoor temperature sensor capable of transmitting indoor air temperature to the main controller 40. The main controller 40 calculates an entire air conditioning load of the air conditioning system 1 from the set temperature and the indoor air temperature thus received. The main controller 40 calculates total airflow volume and necessary refrigerant circulation volume from the air conditioning load thus calculated. The main controller 40 calculates individual supply air volume of each of the fan units 30 by multiplying the total airflow volume and a ratio of the air conditioning load of each of the fan units 30, and transmits commands to the plurality of fan controllers 34. The air conditioning system 1 may be configured such that each of the fan controllers 34 individually adjusts in accordance with the individual supply air volume commanded by the main controller 40.

(4-10) Modification Example 1J

As to the air conditioning system 1 according to the first embodiment, description is made to the case where total airflow volume is determined principally and the main controller 40 controls to follow a condition for the refrigerant of the heat source unit 50. The air conditioning system 1 may alternatively be configured to principally determine a condition for the refrigerant of the heat source unit 50 and determine total airflow volume in accordance with the condition.

For example, the air conditioning system 1 is configured such that the heat source controller 56 controls at least one of the operating frequency of the compressor 51 and the opening degree of the expansion valve 53. In the air conditioning system 1 thus configured, the heat source controller 56 acquires information on the current total airflow volume of air passing the utilization heat exchanger 11. The heat source controller 56 transmits, to the main controller 40, that the current total airflow volume needs to be increased or decreased in accordance with information on at least one of the operating frequency of the compressor 51 and the opening degree of the expansion valve 53. The main controller 40 receives a command to increase or decrease the airflow volume from the heat source controller 56, calculates appropriate proportions of increase or decrease in airflow volume of the plurality of fan units 30 for energy suppression in the entire system, and commands the fan units 30.

(4-11) Modification Example 1K

In the air conditioning system 1 according to the first embodiment, the operating frequency of the compressor 51 is changed to adjust the refrigerant circulation volume of the refrigerant circuit 200. Control of the refrigerant circulation volume in the air conditioning system 1 is, however, not limited to control of the operating frequency of the compressor 51. For example, the refrigerant circulation volume of the refrigerant circuit 200 may be controlled to be adjusted by adjusting the operating frequency of the compressor 51 as well as the opening degree of the expansion valve 53. Alternatively, the refrigerant circulation volume of the refrigerant circuit 200 may be controlled to be adjusted by adjusting the opening degree of the expansion valve 53.

(4-12) Modification Example 1L

The above first embodiment provides the lower limit value of the total airflow volume determined in accordance with the heat exchanger temperature of the utilization heat exchanger 11. There may alternatively be referred to condensation temperature (TC), evaporation temperature (TE), a degree of superheating (SH), or a degree of subcooling (SC). The degree of superheating can be calculated from inlet temperature and outlet temperature of the utilization heat exchanger 11, or inlet pressure and outlet temperature of the utilization heat exchanger 11. The degree of subcooling can be calculated from inlet temperature and outlet temperature of the utilization heat exchanger 11, or inlet pressure and outlet temperature of the utilization heat exchanger 11.

The lower limit value of the total airflow volume may be a preliminarily determined and fixed value. When the lower limit value is preliminarily determined as 8 m$^3$/min, the main controller 40 controls such that the total airflow volume constantly does not become less than the lower limit value 8 m$^3$/min.

The air conditioning system 1 may alternatively be configured to have, for cooling operation, the lower limit value of the total airflow volume exemplarily determined in accordance with the degree of superheating, the current total airflow volume, and suction temperature of air sucked into the heat exchanger unit 10. The air conditioning system 1 may still alternatively be configured to have, for heating operation, the lower limit value of the total airflow volume determined in accordance with the degree of subcooling, the current total airflow volume, and suction temperature of air sucked into the heat exchanger unit 10. The air conditioning system 1 may still alternatively be configured to have the lower limit value of the total airflow volume determined in accordance with the refrigerant circulation volume (e.g. the operating frequency of the compressor 51), the evaporation temperature (TE), as well as suction temperature and sucked airflow volume of air sucked to the heat exchanger unit 10. The air conditioning system 1 may still alternatively be configured to have the lower limit value of the total airflow volume determined in accordance with the current airflow volume and excessive or insufficient airflow volume calculated from a dried or wetted degree of the refrigerant having passed the utilization heat exchanger 11. The air conditioning system 1 may still alternatively be configured to have the lower limit value of the total airflow volume determined in accordance with refrigerant pressure and refrigerant temperature at the outlet port of the utilization heat exchanger 11.

(4-13) Modification Example 1M

4-13-1

Figure 5:
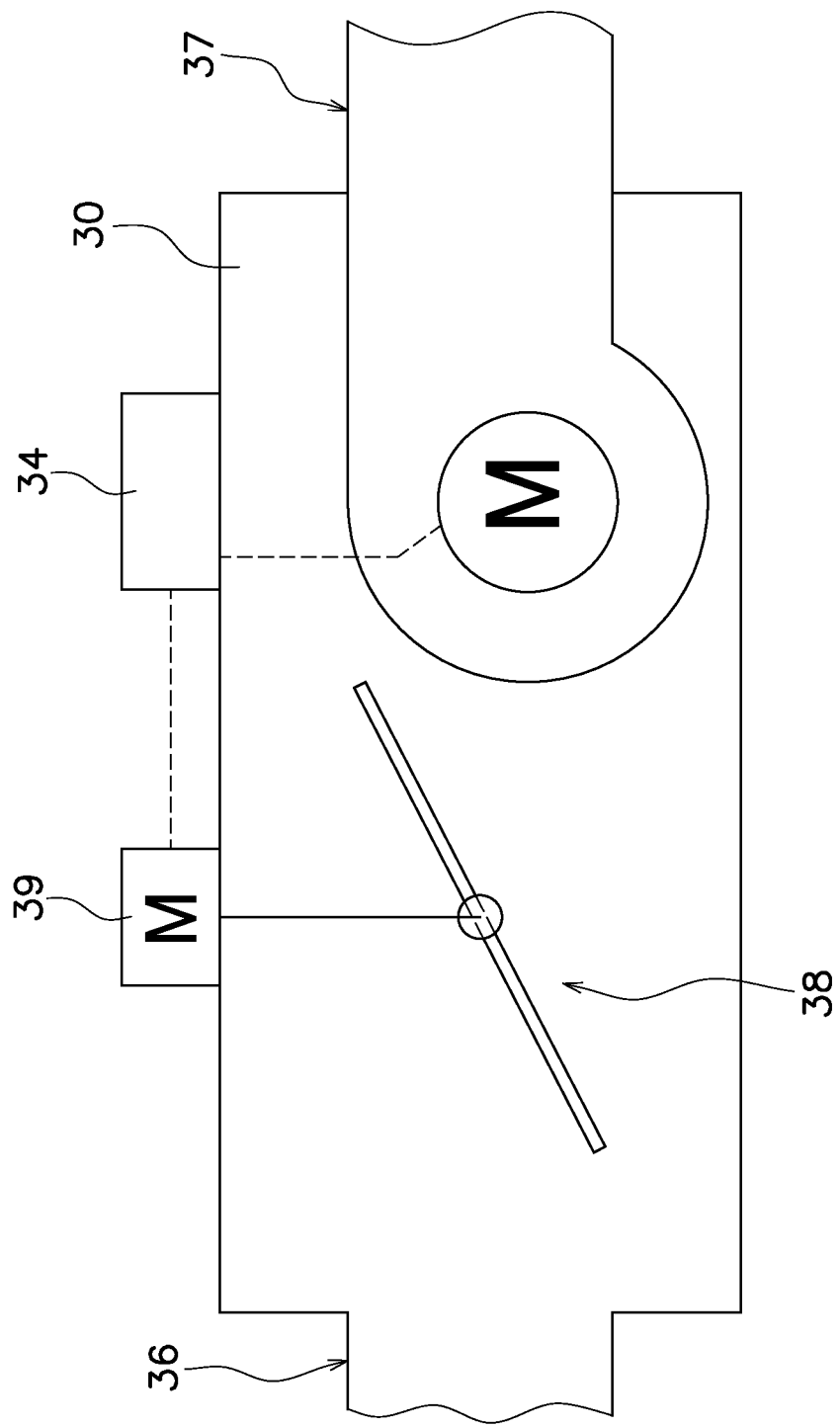
FIG. 5 is a schematic diagram depicting another exemplary configuration of the fan unit.

The first embodiment exemplifies the fan motors 33 having a variable rotation speed, as the plurality of actuators configured to change individual supply air volume of conditioned air sucked from the heat exchanger unit 10 through the plurality of ducts 20 and supplied to the plurality of air outlet 71 in the air conditioning target space SA. The actuators are not limited to the fan motors 33, and examples of the actuators include a drive motor 39 of a damper 38 depicted in FIG. 5. The fan motor 33 of the fan 32 depicted in FIG. 5 may of a type having a variable rotation speed as in the first embodiment, or may of a type having a nonvariable rotation speed. When the fan motor 33 is of the type having a nonvariable rotation speed, supply air volume (airflow volume) from the fan unit 30 to the blow-out port unit 70 is changed only with use of the damper 38. In contrast, when the fan motor 33 is of the type having a variable rotation speed, the supply air volume (airflow volume) from the fan unit 30 to the blow-out port unit 70 is changed through change in opening degree of the damper 38 in combination with change in the rotation speed of the fan motor 33.

(4-13-2) Operation During Occurrence of Backflow

The main controller 40 eliminates an air backflow in cooperation with the fan units 30. For elimination of an air backflow, the main controller 40 initially detects the fan unit 30 connected to the distribution flow path having the air backflow. When the fan unit 30 is configured to adjust supply air volume only with use of the damper 38, the main controller 40 transmits a command to change the opening degree of the damper 38 to the fan controller 34 of the fan unit 30 on the distribution flow path having the air backflow. A command to fully close the damper 38 is transmitted in an exemplary case where the fan unit 30 having the air backflow is not in operation. There is normally caused no air backflow when the fan motor 33 constantly rotates to blow and air blows in accordance with the opening degree of the damper 38. Upon occurrence of an air backflow in such a case, the main controller 40 notifies a user of abnormality occurrence with use of the remote controller 60 or the like.

When the fan unit 30 is configured to adjust supply air volume by means of both the rotation speed of the fan motor 33 and the opening degree of the damper 38, the main controller 40 transmits a command to change at least one of the rotation speed of the fan motor 33 and the opening degree of the damper 38 to the fan controller 34 of the fan unit 30 on the distribution flow path having the air backflow. A command to fully close the damper 38 is transmitted in an exemplary case where the fan unit 30 having the air backflow is not in operation. In another case where the fan motor 33 is rotating at low speed, the main controller 40 transmits a command to further increase the rotation speed. When the fan motor 33 is rotating at low speed, the main controller 40 may alternatively be configured to transmit a command to decrease the opening degree of the damper 38 as well as increase the rotation speed of the fan motor 33.

(4-14) Modification Example 1N

The first embodiment described above refers to the case where the differential pressure sensor 121 is adopted as a detector configured to detect an air backflow. However, the detector configured to detect an air backflow is not limited to the differential pressure sensor 121. Examples of the detector also include a wind speed sensor having directivity. When the differential pressure sensor 121 is replaced with a wind direction sensor having directivity, the wind direction sensor is exemplarily disposed at the fan unit 30 and is connected to the fan controller 34. With use of the wind direction sensor having directivity, the main controller 40 can detect that air flows in a normal direction when wind speed in a positive direction is indicated, and that an air backflow occurs when wind speed in an opposite negative direction is indicated. The examples of the detector also include a wind speed sensor having no directivity. When a plurality of wind speed sensors having no directivity detects wind speed distribution and the wind speed distribution occurs with a backflow, the main controller 40 can determine that there occurs a backflow.

(4-15) Modification Example 1O

The first embodiment described above refers to the configuration for detection of differential pressure within a determined section with use of the differential pressure sensor 121 (airflow volume sensing unit). The configuration for sensing of airflow volume is not limited to the above. For example, airflow volume can be sensed exemplarily by sensing differential pressure between in front of and behind the fan 32 of the fan unit 30 with use of the differential pressure sensor, and calculating airflow volume with use of the main controller 40 or the fan controller 34 from a differential pressure characteristic between in front of and behind the fan 32. The differential pressure sensor functions as the airflow volume sensing unit also in this case. For example, wind speed at a specific position can be sensed with use of the wind speed sensor, and the main controller 40 or the fan controller 34 can calculate airflow volume from a wind speed characteristic at the specific position. The wind speed sensor functions as the airflow volume sensing unit in this case. For example, internal pressure displacement can be sensed with use of a pressure sensor, and the main controller 40 or the fan controller 34 can calculate airflow volume with comparison between internal pressure displacement during predefined airflow volume and the pressure displacement thus sensed. The pressure sensor functions as the airflow volume sensing unit in this case. For example, with use of operation current of the fan 32, the main controller 40 or the fan controller 34 can be configured to calculate airflow volume from a workload of the fan motor 33. A device configured to sense operation current functions the airflow volume sensing unit in this case.

(4-16) Modification Example 1P

The first embodiment described above refers to the exemplary case where the main controller 40 calculates refrigerant circulation volume and transmits, to the heat source controller 56, a request for change in operating frequency of the compressor 51, and the heat source controller 56 controls the operating frequency of the compressor 51. The air conditioning system 1 may alternatively be configured such that the main controller 40 controls at least one of the operating frequency of the compressor 51 and the opening degree of the expansion valve 53.

(4-17) Modification Example 1Q

The first embodiment described above exemplifies the case where the main controller 40 is provided at the heat exchanger unit 10. However, the main controller 40 is provided at a place not limited to the heat exchanger unit 10. The main controller 40 may be exemplarily at the fan unit 30.

(5) Characteristics 5-1

The main controller 40 in the air conditioning system 1 controls the fan motors 33, the drive motors 39 of the dampers 38, or the wind direction plate motors 75 of the wind direction plates 74, as the plurality of actuators of the plurality of fan units 30, such that the airflow volume through the utilization heat exchanger 11 satisfies a predetermined condition. This configuration inhibits malfunction of the air conditioning system 1 by means of the airflow volume through the utilization heat exchanger 11.

5-2

The air conditioning system 1 detects airflow volume of each of the totally four distribution flow paths including the distribution flow path constituted by the duct 20a, the fan unit 30a, and the blow-out port 71 of the blow-out port unit 70a, and the three distribution flow paths similarly constituted by the ducts 20b to 20d, the fan units 30b to 30d, and the air outlet 71 of the blow-out port units 70b to 70d. The main controller 40 totals the airflow volume thus detected, and controls the fan motors 33, the drive motors 39, or the wind direction plate motors 75 as the actuators in accordance with total airflow volume thus obtained.

5-3

More specifically, the main controller 40 controls the numbers of revolutions of the plurality of fan motors 33 with reference to the plurality of airflow volume of the plurality of distribution flow paths detected by differential pressure sensors 1121 or the wind speed sensors as the plurality of airflow volume sensing units. This configuration facilitates control such that the airflow volume through the utilization heat exchanger 11 satisfies the predetermined condition.

5-4

As described in the modification examples, the main controller 40 controls to change the plurality of airflow volume by changing the opening degrees of the plurality of dampers 38 with use of the drive motors 39 as the plurality of opening-closing devices, with reference to the detection values of the plurality of airflow volume of the plurality of distribution flow paths detected by the plurality of differential pressure sensors 121 or the wind speed sensors. The main controller 40 can thus easily control such that the airflow volume through the utilization heat exchanger 11 satisfies the predetermined condition.

5-5

The predetermined condition of the air conditioning system 1 is to set the airflow volume through the utilization heat exchanger 11 to be equal to or more than the lower limit value. This configuration inhibits malfunction of the air conditioning system 1, which is caused by insufficient heat exchange in the utilization heat exchanger 11 due to the airflow volume through the utilization heat exchanger 11 being less than the lower limit value.

5-6

The heat source unit 50 is a heat source device including the compressor 51 and constituting the refrigerant circuit 200 along with the utilization heat exchanger 11. The refrigerant circuit 200 achieves the vapor compression refrigeration cycle. The main controller 40 is connected to the heat source controller 56, and links control of the fan motors 33, the drive motors 39 of the dampers 38, or the wind direction plate motors 75 of the wind direction plates 74 with control of the refrigerant circuit 200. The air conditioning system 1 can thus appropriately control the airflow volume through the utilization heat exchanger 11 by means of the fan motors 33, the drive motors 39, or the wind direction plate motors 75 as the plurality of actuators in accordance with a state of the refrigerant circuit 200, to achieve efficient operation.

5-7

In the air conditioning system 1, the lower limit value of the airflow volume through the utilization heat exchanger 11 is set to vary in accordance with the parameter of the heat source unit 50 influencing the state or the circulation volume of the refrigerant circulating in the refrigerant circuit 200. The air conditioning system 1 thus causes the utilization heat exchanger 11 to exchange heat suitably for the state or the circulation volume of the refrigerant circulating in the refrigerant circuit 200 to achieve an appropriate state of the refrigerant passing the utilization heat exchanger 11 and inhibit malfunction of the heat source unit 50 as the heat source device.

5-8

When the lower limit value of the airflow volume through the utilization heat exchanger 11 is set to vary in accordance with a value relevant to the circulation volume of the refrigerant in the refrigerant circuit 200, the air conditioning system causes the utilization heat exchanger 11 to exchange heat at the lower limit value of the appropriate airflow volume suitable for the circulation volume of the refrigerant circulating in the refrigerant circuit 200, to inhibit malfunction of the heat source unit 50 as the heat source device.

5-9

The lower limit value of the airflow volume is set to vary in accordance with the parameter of the heat source unit 50 as the heat source device influencing the state or the circulation volume of the refrigerant circulating in the refrigerant circuit 200. The air conditioning system 1 causes the utilization heat exchanger 11 to exchange heat suitably for the state or the circulation volume of the refrigerant circulating in the refrigerant circuit 200, to suppress energy consumption of the air conditioning system 1. Examples of the parameter of the heat source unit 50 for suppression in energy consumption of the air conditioning system 1 through change in lower limit value of the airflow volume through the utilization heat exchanger 11 include the condensation temperature of the refrigerant circuit 200, the evaporation temperature of the refrigerant circuit 200, the heat exchanger temperature of the utilization heat exchanger 11, the operating frequency of the compressor 51, combination of inlet temperature and outlet temperature of the utilization heat exchanger 11, and combination of inlet pressure and the outlet temperature of the utilization heat exchanger 11.

5-10

When the remote controller 60 transmits a command to stop blowing or further decrease the airflow volume for at least one of the fan units 30 and the airflow volume through the utilization heat exchanger 11 is calculated to be less than the lower limit value, the air conditioning system 1 may alternatively be configured such that the main controller 40 controls to allocate the airflow volume also to the fan unit 30 commanded to stop blowing in the plurality of fan units 30. Such control can suppress increase in airflow volume per fan unit and can suppress a partial gap of the indoor air temperature from the set temperature in the air conditioning target space SA.

5-11

The air conditioning system 1 may still alternatively be configured such that the main controller 40 controls to allocate the airflow volume to each operating one of the plurality of fan units 30. When the main controller 40 controls in this manner, there is no need to operate the fan unit 30 commanded to stop in the plurality of fan units 30. This configuration reliably stops any one of the fan units 30 for a place desired to stop air conditioning, and inhibits the air conditioning system 1 from operating not in accordance with a user request.

Second Embodiment (6) Entire Configuration

In the air conditioning system 1 according to the first embodiment, the main controller 40 controls the plurality of actuators in accordance with the plurality of commands on supply air volume of the plurality of fan units 30. Such a mode is not limited to the mode of the air conditioning system 1 according to the first embodiment. The air conditioning system 1, in which the main controller 40 controls the plurality of actuators in accordance with the plurality of commands on supply air volume of the plurality of fan units 30, may alternatively be configured as in the second embodiment.

In the air conditioning system according to the second embodiment, the plurality of fan controllers as a plurality of sub controllers receives the plurality of commands transmitted from the main controller. In the air conditioning system according to the second embodiment, each of the fan controllers controls at least one of the actuators in accordance with at least one of the commands.

Specifically, exemplarily described is the case where the air conditioning system 1 according to the second embodiment includes the configurations depicted in FIG. 1 similarly to the air conditioning system 1 according to the first embodiment. The second embodiment relates to the case where the air conditioning system 1 depicted in FIG. 1 changes supply air volume by means of the fan motors 33, whereas the dampers 38 or the wind direction plates 74 are not involved in change in supply air volume.

Similarly to the main controller 40 according to the first embodiment, the main controller 40 according to the second embodiment calculates necessary supply air volume to be blown out of the fan units 30, from the blow-out temperature detected by the blow-out temperature sensors 122 and the set temperature. Specifically, the main controller 40 exemplarily calculates supply air volume of each of the fan units 30a to 30d from the temperature difference between the indoor air temperature adjusted by the corresponding one of the fan units 30a to 30d and the set temperature, as well as the blowing air temperature. The main controller 40 determines, as commands to be transmitted to the fan units 30a to 30d, the calculated supply air volume (target supply air volume) of the fan units 30a to 30d.

The main controller 40 transmits, to the plurality of fan controllers 34, the plurality of supply air volume thus calculated as the target supply air volume. In other words, the main controller 40 transmits the plurality of commands to the plurality of fan controllers 34 configured to control the fan units 30a to 30d. For example, the main controller 40 transmits the target supply air volume of the fan unit 30a to the fan controller 34 attached to the fan unit 30a. The target supply air volume of the fan unit 30a corresponds to the command on supply air volume of the fan unit 30. The fan controller 34 of the fan unit 30a controls the rotation speed of the fan motor 33a so as to approach the supply air volume to the target supply air volume. Similarly, the main controller 40 transmits the target supply air volume of the fan units 30b to 30d to the fan controllers 34 attached to the fan units 30b to 30d, respectively. The fan controllers 34 of the fan units 30b to 30d control the fan motors 33b to 33d so as to approach the supply air volume to the target supply air volume.

In more detail, the fan units 30a to 30d according to the second embodiment each include a wind speed sensor instead of and at a position of the differential pressure sensor 121 as the airflow volume sensing unit configured to sense airflow volume through the unit. The airflow volume sensing unit is not limited to the wind speed sensor. Examples of the airflow volume sensing unit include the differential pressure sensor 121. For example, the fan controller 34 of the fan unit 30a compares wind speed of the fan unit 30a with target airflow volume (target supply air volume). The fan controller 34 of the fan unit 30a increases the rotation speed of the fan motor 33a in a case where airflow volume through the fan unit 30a is less than the target airflow volume, to increase the airflow volume (supply air volume) of the fan unit 30a so as to approach the target airflow volume. The fan controller 34 decreases the rotation speed of the fan motor 33a in another case where the airflow volume through the fan unit 30a is more than the target airflow volume, to decrease the airflow volume (supply air volume) of the fan unit 30a so as to approach the target airflow volume. Description is made to the case where the fan controller 34 is attached to the fan unit 30. The fan controller 34 may, however, not be attached to the fan unit 30.

The embodiment of the present disclosure has been described above. Various modifications to modes and details should be available without departing from the object and the scope of the present disclosure recited in the claims.

REFERENCE SIGNS LIST

1: air conditioning system
10: heat exchanger unit
11: utilization heat exchanger
20, 20a to 20d: duct
30, 30a to 30d: fan unit
33: fan motor (exemplifying actuator)
38: damper
39: drive motor (exemplifying actuator or opening-closing device)
40: main controller
50: heat source unit (exemplifying heat source device)
51: compressor
52: heat source heat exchanger
53: expansion valve
60: remote controller
74: wind direction plate
75: wind direction plate motor (exemplifying actuator)
121: differential pressure sensor (exemplifying airflow volume sensing unit)
200: refrigerant circuit

CITATION LIST

Patent Literature

Patent Literature 1: JP H11-132489 A

The invention claimed is:

1. An air conditioning system comprising:
a heat exchanger unit having a utilization heat exchanger and configured to generate conditioned air through heat exchange in the utilization heat exchanger and supply an air conditioning target space with the conditioned air through a plurality of distribution flow paths communicating with the heat exchanger unit,
each of the plurality of distribution flow paths including a duct connected to the heat exchanger unit and provided for distribution of the conditioned air, a fan unit provided correspondingly to the duct and configured to supply the air conditioning target space with the conditioned air from the heat exchanger unit through the duct, as well as an actuator configured to individually change supply air volume of the conditioned air supplied to the air conditioning target space, and
the air conditioning system further comprising a main controller configured to control actuators in the plurality of distribution flow paths such that airflow volume through the utilization heat exchanger satisfies a predetermined condition, wherein
the predetermined condition is to cause the airflow volume through the utilization heat exchanger to be more than a lower limit value of airflow that causes malfunction caused by insufficient heat exchange in the utilization heat exchanger.

2. The air conditioning system according to claim 1, wherein
at least either ducts or fan units each include an airflow volume sensor, and
the main controller is configured to obtain a total airflow volume of airflow through the distribution flow paths by detecting the airflow volume by airflow volume sensors and controlling the actuators such that the detected total airflow volume satisfies the predetermined condition.

3. The air conditioning system according to claim 2, wherein
the actuators are fan motors of the fan units, and
the main controller controls a number of revolution of each of the fan motors in accordance with values of the airflow volume sensors.

4. The air conditioning system according to claim 3, wherein
each of the actuators includes a motor configured to adjust an opening degree of a damper included in each of the fan units, and
the main controller controls the opening degrees of the dampers using motors in accordance with values of the airflow volume sensors.

5. The air conditioning system according to claim 2, wherein
each of the actuators includes a motor configured to adjust an opening degree of a damper included in each of the fan units, and
the main controller controls the opening degrees of the dampers using motors in accordance with values of the airflow volume sensors.

6. The air conditioning system according to claim 1, further comprising:
a heat source device connected to the utilization heat exchanger, including a compressor, and constituting a refrigerant circuit configured to achieve a vapor compression refrigeration cycle along with the utilization heat exchanger, wherein
the main controller links control of the actuators with control of the refrigerant circuit.

7. The air conditioning system according to claim 6, wherein
the main controller activates the fan unit being stopped when the airflow volume through the utilization heat exchanger is less than the predetermined value in accordance with a command to reduce airflow volume of the fan unit.

8. The air conditioning system according to claim 6, wherein
the main controller increases airflow volume of the fan unit when the airflow volume through the utilization heat exchanger is less than the predetermined value in accordance with a command to reduce the airflow volume of the fan unit.

9. The air conditioning system according to claim 1, wherein
the main controller activates the fan unit being stopped when the airflow volume through the utilization heat exchanger is less than the predetermined value in accordance with a command to reduce airflow volume of the fan unit.

10. The air conditioning system according to claim 1, wherein
the main controller increases airflow volume of the fan unit when the airflow volume through the utilization heat exchanger is less than the predetermined value in accordance with a command to reduce the airflow volume of the fan unit.

11. An air conditioning comprising:
a heat exchanger unit having a utilization heat exchanger and configured to generate conditioned air through heat exchange in the utilization heat exchanger and supply an air conditioning target space with the conditioned air through a plurality of distribution flow paths communicating with the heat exchanger unit,
each of the plurality of distribution flow paths including a duct connected to the heat exchanger unit and provided for distribution of the conditioned air, a fan unit provided correspondingly to the duct and configured to supply the air conditioning target space with the conditioned air from the heat exchanger unit through the duct, as well as an actuator configured to individually change supply air volume of the conditioned air supplied to the air conditioning target space, and
the air conditioning system further comprising a main controller configured to control actuators in the plurality of distribution flow paths such that airflow volume through the utilization heat exchanger satisfies a predetermined condition, wherein
the predetermined condition is to cause the airflow volume through the utilization heat exchanger to be a predetermined value or more, and
the air conditioning system further comprising:
a heat source device connected to the utilization heat exchanger including a compressor, and constituting a refrigerant circuit configured to achieve a vapor compression refrigeration cycle along with the utilization heat exchanger, wherein
the main controller links control of the actuators with control of the refrigerant circuit, and
the predetermined value is set to vary in accordance with a parameter of the heat source device influencing a state or circulation volume of a refrigerant circulating in the refrigerant circuit.

12. The air conditioning system according to claim 11, wherein
the parameter has a value relevant to the circulation volume.

13. The air conditioning system according to claim 12, wherein
the main controller activates the fan unit being stopped when the airflow volume through the utilization heat exchanger is less than the predetermined value in accordance with a command to reduce airflow volume of the fan unit.

14. The air conditioning system according to claim 11, wherein
the parameter includes at least one of condensation temperature of the refrigerant circuit, evaporation temperature of the refrigerant circuit, heat exchanger temperature of the utilization heat exchanger, an operating frequency of the compressor, a degree of superheating of the refrigerant circuit, a degree of subcooling of the refrigerant circuit, combination of inlet temperature and outlet temperature of the utilization heat exchanger, and combination of inlet pressure and the outlet temperature of the utilization heat exchanger.

15. The air conditioning system according to claim 14, wherein
the main controller activates the fan unit being stopped when the airflow volume through the utilization heat exchanger is less than the predetermined value in accordance with a command to reduce airflow volume of the fan unit.

16. The air conditioning system according to claim 11, wherein
the main controller activates the fan unit being stopped when the airflow volume through the utilization heat exchanger is less than the predetermined value in accordance with a command to reduce airflow volume of the fan unit.

* * * * *